(12) United States Patent
Ouderkirk

(10) Patent No.: US 10,688,768 B2
(45) Date of Patent: Jun. 23, 2020

(54) GLASS AND POLYMER FILM ASSEMBLIES AND METHODS OF MAKING

(71) Applicant: 3M INNOVATIVE PROPERTIES COMPANY, St. Paul, MN (US)

(72) Inventor: Andrew J. Ouderkirk, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 143 days.

(21) Appl. No.: 15/326,215

(22) PCT Filed: Jul. 31, 2015

(86) PCT No.: PCT/US2015/043049
§ 371 (c)(1),
(2) Date: Jan. 13, 2017

(87) PCT Pub. No.: WO2016/025188
PCT Pub. Date: Feb. 18, 2016

(65) Prior Publication Data
US 2017/0210095 A1    Jul. 27, 2017

Related U.S. Application Data

(60) Provisional application No. 62/037,862, filed on Aug. 15, 2014.

(51) Int. Cl.
*B32B 38/10* (2006.01)
*B32B 37/06* (2006.01)
(Continued)

(52) U.S. Cl.
CPC .......... *B32B 38/10* (2013.01); *B29C 65/028* (2013.01); *B29C 65/44* (2013.01);
(Continued)

(58) Field of Classification Search
CPC . B29C 65/44; B29C 65/028; B29C 66/72326; B29C 66/7465;
(Continued)

(56) References Cited

U.S. PATENT DOCUMENTS 3,791,911 A * 2/1974 Yaeger .................... B32B 27/00
428/112
4,021,287 A * 5/1977 Martin .................. B29C 65/106
156/497
(Continued)

FOREIGN PATENT DOCUMENTS

DE    19923683    11/2000
DE    10323304    4/2004
(Continued)

OTHER PUBLICATIONS

Breese, A review of modeling approaches for oriented semi-crystalline polymers, 2004, pp. 439-448.
(Continued)

*Primary Examiner* — John L Goff, II
(74) *Attorney, Agent, or Firm* — Clifton F. Richardson

(57) ABSTRACT

A glass and polymer film assembly including a glass film and a polymer film bonded to a surface of the glass film. The polymer film is directly bonded to the glass film by applying the polymer to the glass film when the glass film is above a bonding temperature of the polymer film. The glass film may have a thickness less than about 1 mm and the polymer film may be an oriented semicrystalline homopolymer which is permanently bonded to a major surface of the glass film.

15 Claims, 3 Drawing Sheets

(51) Int. Cl.
| | |
|---|---|
| *B32B 37/04* | (2006.01) |
| *B32B 27/36* | (2006.01) |
| *B32B 7/06* | (2019.01) |
| *B29C 65/02* | (2006.01) |
| *B32B 37/15* | (2006.01) |
| *B29C 65/00* | (2006.01) |
| *B29C 65/44* | (2006.01) |
| *B32B 17/06* | (2006.01) |
| *B32B 37/08* | (2006.01) |
| *B32B 37/14* | (2006.01) |
| *B32B 37/00* | (2006.01) |
| *B32B 37/20* | (2006.01) |
| *B29C 65/82* | (2006.01) |
| *C03B 17/06* | (2006.01) |

(52) U.S. Cl.
CPC ......... *B29C 66/1122* (2013.01); *B29C 66/45* (2013.01); *B29C 66/71* (2013.01); *B29C 66/7352* (2013.01); *B29C 66/73711* (2013.01); *B29C 66/73773* (2013.01); *B29C 66/7465* (2013.01); *B29C 66/83413* (2013.01); *B29C 66/83415* (2013.01); *B29C 66/91221* (2013.01); *B29C 66/91951* (2013.01); *B32B 7/06* (2013.01); *B32B 17/064* (2013.01); *B32B 27/36* (2013.01); *B32B 37/04* (2013.01); *B32B 37/06* (2013.01); *B32B 37/08* (2013.01); *B32B 37/14* (2013.01); *B32B 37/15* (2013.01); *B29C 65/8253* (2013.01); *B29C 66/43* (2013.01); *B29C 66/723* (2013.01); *B29C 66/7392* (2013.01); *B29C 66/73771* (2013.01); *B29C 66/91933* (2013.01); *B29C 66/91935* (2013.01); *B29C 66/91943* (2013.01); *B29C 66/91945* (2013.01); *B32B 37/003* (2013.01); *B32B 37/0015* (2013.01); *B32B 37/0053* (2013.01); *B32B 37/144* (2013.01); *B32B 37/20* (2013.01); *B32B 2037/0092* (2013.01); *B32B 2307/514* (2013.01); *B32B 2309/10* (2013.01); *B32B 2309/105* (2013.01); *B32B 2309/68* (2013.01); *B32B 2315/08* (2013.01); *C03B 17/064* (2013.01)

(58) Field of Classification Search
CPC ......... B29C 66/73711; B29C 66/73712; B29C 66/73713; B32B 17/0614; B32B 17/10; B32B 17/10027; B32B 38/10; B32B 38/105; B32B 43/006
USPC .................................. 156/247, 249
See application file for complete search history.

(56) References Cited

U.S. PATENT DOCUMENTS

| | | | |
|---|---|---|---|
| 4,879,176 | A | 11/1989 | Ouderkirk |
| 5,264,534 | A | 11/1993 | Kovar |
| 6,815,070 | B1 * | 11/2004 | Burkle ............... B32B 3/04 427/165 |
| 2004/0197575 | A1 | 10/2004 | Bocko |
| 2006/0113025 | A1 | 6/2006 | Sklyarevich |
| 2010/0192634 | A1 | 8/2010 | Higuchi |
| 2010/0260964 | A1 * | 10/2010 | Nakamura ............ B32B 7/06 428/76 |
| 2010/0276066 | A1 | 11/2010 | Kondo |
| 2011/0023548 | A1 | 2/2011 | Garner |
| 2012/0131955 | A1 | 5/2012 | Kuroiwa et al. |
| 2012/0171454 | A1 * | 7/2012 | Kondo ............... B32B 17/10 428/220 |

FOREIGN PATENT DOCUMENTS

| | | |
|---|---|---|
| GB | 1319846 | 6/1973 |
| WO | WO 93/24320 | 12/1993 |
| WO | WO 2000-72345 | 11/2000 |
| WO | 2010-141832 | 12/2010 |
| WO | WO 2012-141962 | 10/2012 |
| WO | WO 2012-166343 | 12/2012 |
| WO | WO 2013-070672 | 5/2013 |

OTHER PUBLICATIONS

International Search Report for PCT International Application No. PCT/US2015/043049 dated Oct. 29, 2015, 4 pages.

* cited by examiner

GLASS AND POLYMER FILM ASSEMBLIES AND METHODS OF MAKING

BACKGROUND

A thin glass sheet or film can be produced using a die where molten glass flows over two opposite sides of an extended feedblock, and the glass flows are combined at the bottom of the feedblock. This process can produce thin glass film. However, the thin glass film may be brittle and difficult to handle. Techniques to improve the handleability of thin glass films are needed.

SUMMARY

In some aspect of the present description, a glass and polymer film assembly is provided that includes a glass film having a thickness less than about 1 mm and having a first major surface and a second major surface opposite the first major surface, and includes a first homopolymer permanently bonded to the first major surface of the glass film. The first homopolymer is an oriented semicrystalline polymer.

In some aspect of the present description, a method of forming a glass and polymer film assembly is provided that includes the steps of providing a first polymer film, providing a glass sheet having a first major surface and a second major surface opposite the first major surface, applying the first polymer film to the first major surface of the glass sheet, and allowing the first polymer film to bond to the first major surface of the glass sheet. The glass sheet has a thickness less than about 1 mm. The glass sheet is at a temperature above a bonding temperature of the first polymer film during the step of applying the first polymer film.

In some aspect of the present description, a method of forming a glass and polymer film assembly is provided that includes the steps of providing a first polymer film, providing a molten glass at a first temperature, forming a glass sheet by cooling the molten glass to a second temperature higher than a bonding temperature of the first polymer film and higher than room temperature, applying the first polymer film to a first major surface of the glass sheet, and allowing the first polymer film to bond to the first major surface of the glass sheet. The glass sheet is at the second temperature during the step of applying the first polymer film.

DETAILED DESCRIPTION

In the following description, reference is made to the accompanying drawings that forms a part hereof and in which are shown by way of illustration. Descriptions for elements in figures should be understood to apply equally to corresponding elements in other figures, unless indicated otherwise. The figures are not necessarily to scale. It is to be understood that other embodiments are contemplated and may be made without departing from the scope or spirit of the present disclosure. The following detailed description, therefore, is not to be taken in a limiting sense.

As used herein, layers, components, or elements may be described as being adjacent one another. Layers, components, or elements can be adjacent one another by being in direct contact, by being connected through one or more other components, or by being held next to one another or attached to one another. Layers, components, or elements that are in direct contact may be described as being immediately adjacent.

A thin glass sheet or film can be produced using a die where molten glass flows over two opposite sides of an extended feedblock, and the glass flows are combined at the bottom of the feedblock. This process can produce an extremely thin glass film. As used herein, "glass sheet" and "glass film" are used interchangeably to describe thin (e.g., less than about 1 mm thick) glass sheet or thin glass film. Glass sheet as thin as 50 microns is currently commercially available. Using techniques similar to glass fiber drawing, it may be possible to draw glass sheet as thin as 1 micron, but it would be very difficult to handle such thin glass sheet using conventional methods.

Thin glass sheet is typically brittle and difficult to handle. Handleability can be improved by applying an adhesive coated polymer film to a portion or all of one or both sides of the glass. According to the present description, it has been discovered that a polymer film attached directly to a thin glass sheet that is cooling from the casting process provides a higher degree of handleability and yield compared to the case where a polymer is attached to cooled glass through an adhesive layer. It has further been discovered, that such glass/polymer film laminates can be economically applied as a step during the manufacturing of the thin glass sheet. The resulting glass and polymer film assembly can provide a low-cost, flexible substrate that has high stiffness, high durability, high thermal resistance, high and consistent barrier properties, and high dielectric strength.

Figure 1:
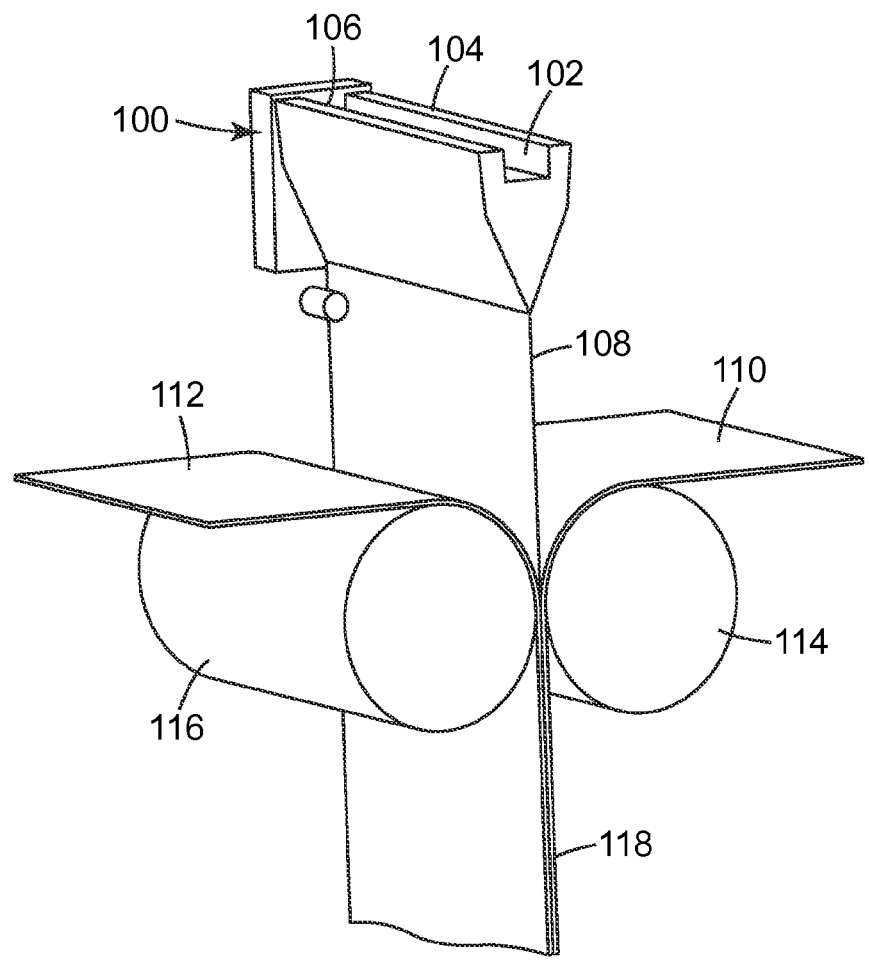
FIG. 1 illustrates a process for making a glass and polymer film assembly.

Suitable processes for producing thin glass film are described in PCT Pub. WO 2010/141832 (Fredholm et al.). As illustrated in FIG. 1, an additional step can be added to such processes to attach one or more polymer films to the thin glass film. FIG. 1 shows the process of casting a thin glass sheet 108 where molten glass flows into an isopipe 100, the glass flows through the trough 102, flows over first edge 104 and second edge 106 forming two glass flows, and the two flows combine to form the thin glass sheet 108. First polymer film 110 and optional second polymer film 112 are nipped to the hot glass sheet using first and second rollers 114 and 116 forming laminate 118.

Although two polymer films are attached in the process illustrated in FIG. 1, in other embodiments only one of the two polymer films are attached. This can be implemented in the process illustrated in FIG. 1, simply by not including second polymer film 112, for example. In this case, first polymer film 110 would be nipped to thin glass sheet 108 through first and second rollers 114 and 116 with second roller 116 serving as a backup roller. In the embodiment illustrate in FIG. 1, the first polymer film 110 and the second polymer film 112 are applied concurrently. In other embodiments, the first polymer film 110 is first applied and the second polymer film 112 is applied after the first polymer film 110 has been applied. This may be useful for bonding polymer films with different bonding temperatures since the glass sheet 108 could cool between applying the first polymer film 110 and applying the second polymer film 112.

The glass used in this process may be a silicate, an aluminosilicate, a borosilicate, or an aluminoborosilicate material. The glass may contain sodium or other alkali and alkaline earth metals, or may be free of alkali and alkaline earth metals.

The glass sheet 108 may have thicker edges than the central region, which is the major portion of the area of the glass. In the central region, the glass sheet may have a thickness of less than about 1 mm, less than about 0.5 mm, less than about 300 µm, less than about 100 µm, less than about 50 µm, or even less than 20 µm. In the central region, the glass sheet 108 may have a thickness greater than about 1 µm. As used herein, thickness of a glass sheet refers to the thickness in the central region unless indicated otherwise.

In some embodiments, the first and second polymer films 110 and 112 are narrower than the full width of the glass sheet 108 so that the first and second polymer films 110 and 112 are attached only to the central region of the glass sheet 108. This can be accomplished using first and second rollers 114 and 116 having widths (i.e., a dimension parallel to the width of the first and second polymer films 110 and 112) less than the full width of the glass sheet 108. In some embodiments the width of first roller 114 is substantially equal to the width of the first polymer film 110 and the width of the second roller 116 is substantially equal to the width of the second polymer film 112. In some embodiments, the widths of the first and second rollers 114 and 116 are greater than the width of the glass sheet 108, and the widths of the first and second polymer films 110 and 112 are greater than the width of the glass sheet 108. This configuration allows the glass sheet 108 to be encapsulated between first and second polymer films 110 and 112.

The glass sheet 108 formed by the isopipe 100 may be contained in a thermal control chamber (not illustrated) before being nipped by the first and second polymer films 110 and 112. The thermal control chamber may serve several purposes, including controlling the draw-down process, annealing the glass, and controlling the temperature of the glass immediately before contacting the first and second polymer films 110 and 112. The thermal control chamber may contain air and/or other gasses such as $CO_2$, Ar, $H_2$, or He. Using different gasses can help minimize gas inclusion during the lamination step.

During the step of applying the first and second polymer films 110 and 112 to the glass sheet 108 (i.e., when the glass sheet 108 initially contacts the first and second polymer films 110 and 112), the temperature of the glass sheet 108 should be above the bonding temperature of both of the first and second polymer films 110 and 112. The melting of the polymer near the surface will absorb some heat, so it may be desired that the temperature of the glass sheet exceeds the melting point of the first or second polymer films by at least several degrees, for example, by at least 20° C., or at least 50° C., or at least about 100° C. The glass sheet 108 may be between 10° C. and 500° C. above the bonding temperature of the first and second polymer films 110 and 112 when the polymer films 110 and 112 initially contact the glass sheet 108. In some embodiments, the glass sheet 108 may be between 50° C. and about 500° C. above the bonding temperature of the first and second polymer films 110 and 112 when the first and second polymer films 110 and 112 initially contact the glass sheet 108. The bonding temperature will typically be above the glass transition temperature for amorphous polymers, and above the melting point for semicrystalline polymers.

The glass sheet 108 may be rapidly cooling after it is formed by the isopipe 100. The interface between the glass sheet 108 and the first polymer film 110, for example, may be above the bonding temperature for only a short time (e.g., about 0.01 milliseconds to about 1 milliseconds) since the glass sheet 108 may be rapidly cooling. As illustrated in the Examples, the surface temperatures of the first and second polymer films 110 and 112 may exceed their respective melting points for a short time, while the bulk of the polymer films do not approach their respective meting points.

Providing hot glass sheet 108 directly from the casting operation can produce a laminate where the glass has minimal defects in the construction. Alternatively, the glass may be provided from a roll or sheet stock, the glass heated to a desired temperature above a bonding temperature for a polymer film, and then the heated glass and the polymer film laminated together.

The first and second polymer films 110 or 112 may thermoplastic polymer films. Suitable polymers include polycarbonates, polyolefins, silicone polymers, polyester polymers including polyethylene terephthalate (PET) and polyethylene naphthalate (PEN) and copolymers thereof, polyacrylates, polyacrylonitriles, polystyrene, polyurethanes, and copolymers thereof. Either of the first and second polymer films 110 or 112 may be a single film or may include multiple film layers. If multiple layers are used, the temperature of the glass sheet 108 during the step of applying first or second polymer films 110 or 112 may be above the bonding temperature of the layer that contacts the glass sheet but does not need to be above a bonding temperature of the other layers. For example, the first polymer film 110 may include a polycarbonate or PET core with a lower melting temperature resin coating, such as a copolymer of polyethylene terephthalate and polyethylene isophthalate. In this case, the temperature of the glass sheet 108 when the first polymer film 110 first contacts the glass sheet 108 may be above the bonding temperature of the resin coating but not above a melting or glass transition temperature of the core material. The polymer layers may also be polymeric composites which contain fibers, such as fiberglass, carbon nanotubes, ceramic filled polymers, or voided polymers. The first and second polymer films 110 and 112 may also contain one or more layers of glass film.

The first and second polymer films 110 and 112 may be unoriented or may be oriented (e.g., uniaxially oriented or biaxially oriented). If oriented, the orientation conditions of the first and second polymer films 110 and 112 may be similar to each other. In this case, the polymer films may be described as having balanced or substantially balanced degrees of orientation. For example, the first and second polymer films 110 and 112 may be oriented in substantially the same direction (or substantially the same directions, if biaxially oriented) and may be oriented to similar levels, for example, by being prepared using similar draw ratios and other conditions, including draw rates, temperatures, and heat-setting.

In order to prevent warpage or curving of the polymer/glass/polymer laminate 118, it may be desirable to have the first and second polymer films 110 and 112 apply balanced forces or stresses to the laminate 118 during storage, or heating or cooling of the laminate 118. Balancing these forces can be achieved by using polymers on each side of the glass that are as similar as possible. For example, two oriented films, which may be homopolymer films, can be used that have similar processing histories, storage conditions and time since production, molecular weight and polydispersity, and orientation conditions, including but not limited to orientation rates, temperatures, degree of orientation, and heat setting conditions. Alternatively, the first and second polymer films may have different thermal coefficients of expansion and shrinkage, but be sufficiently thin such that the stress applied to the laminate is insufficient to cause significant warping or curling.

The first and second polymer films 110 and 112 may be said to produce balanced or substantially balanced forces on the glass sheet 108 if differing forces produced by the first and second polymer films causes only small curvature of a section of the glass and polymer assembly (i.e., the laminate 118). For example, a 10 cm by 10 cm square section cut out of the laminate 118 may show a lateral deflection of less than 2 cm, or less than 1 cm, or less than 5 mm, or less than 2 mm, when suspended vertically by a top edge of the square section. The first and second polymer films 110 and 112 may produce substantially balanced forces on the glass sheet 108 when the laminate 118 is heated or cooled. For example, the first and second polymer films 110 and 112 may produce substantially balanced forces on the glass sheet 108 when the laminate 118 is at any temperature in the range of 15° C. to 35° C.

In some embodiments, the polymer film or polymer films may have a similar composition from its core to the surface being bonded, but a different morphology at the surface. For example, semicrystalline polymers may be amorphized using intense energy sources such as pulsed lasers and flashlamps. In some embodiments, a polymer film or films with a semicrystalline polymer core, such as PET or PEN, and with a modified surface morphology such as that described in U.S. Pat. No. 4,879,176 (Ouderkirk et al.) is thermally bonded to glass using the processes described herein. The amorphized polymer will re-crystallize after bonding, and effectively increase the use temperature of the system. This can result in a glass film having a thickness less than about 1 mm with a first homopolymer permanently bonded to a first major surface of the glass film. The first homopolymer may be oriented semicrystalline polymer. In some embodiments, a second homopolymer is applied to a second major surface of the glass film.

An alternative approach is to contact the semicrystalline polymer film to the glass while the glass temperature is above the polymer melting point, and then cool the construction. The hot glass will melt thorough some or all of the polymer film thickness, and then as the construction cools, the polymer may be at least partially recrystallized. The polymer will have then developed a degree of crystallinity throughout the polymer layer and this can result in an increased use temperature.

The polymer bonding layer may have a bonding temperature above the use temperature of the core polymer, since the transient thermal contact will result in a substantial thermal gradient through the polymer construction. This allows the bonding layer to be briefly at a higher temperature than that experienced by the core polymer. For example, the polymer layer may be made from a polyethylene layer on a PET layer, where the PET layer forms the bond with the glass, yet the polyethylene layer is not damaged.

The polymer films 110 and 112 may be of similar or different compositions. One polymer layer may form a permanent bond, and the other polymer layer may form a lower strength bond, such that the polymer layer may later be removed. Alternatively, only one polymer layer may be applied to the glass. As used herein, a bond between two layers may be said to "permanent" if the two layers cannot be separated without damaging one or both layers. A polymer layer may be said to be releasably attached if it can be separated from the glass layer without significant damage to the glass or to the polymer layer.

The first and second rollers 114 and 116 may be made of one or a combination of materials, including metal, ceramic, or elastomers. The rollers may provide a combination of functions, including applying pressure to the laminate, controlling the timing of the application of polymer layers to the glass. For example, it may be desirable for the glass to come in contact with one polymer layer first, followed briefly with contact with the other polymer on the opposite side of the glass. The rollers may be heated or cooled to provide the best processing conditions for formation of the laminate 118. The polymer may also be preheated or cooled, depending on the desired bonding conditions. The rollers may be coated by a layer of a fluid such as water or oil, or may provide an air cushion, such as with an air bearing, to apply the polymer layer to the glass. If a fluid or air cushion is used, the rollers may be fixed or rotating.

In some embodiments, the first polymer film 110 and/or the second polymer film 112 are dried or out-gassed before lamination using conventional processing techniques.

The region formed between the glass and the polymer film immediately before making contact may be at a low pressure, filled with a heated gas, or filled with a material that prevents bubble or void formation between the bonded glass and polymer surfaces.

The first polymer film 110 and/or the second polymer film 112 may be selected to have a smooth surface contacting the glass sheet and the polymer film(s) may be free of slip particles. Suitable polymer surfaces can be prepared by casting a polymer on a smooth casting wheel followed by bidirectional orientation. An alternative process is to coextruded a layer of a second polymer that forms a temporary bond to a first polymer, remove the second polymer layer either before or after orientation, and bond the newly exposed surface of the first polymer to the glass layer. For example, two coplanar layers of polyethylene and polyethylene terephthalate may be coextruded, the coextrusion may be biaxially oriented, the polyethylene layer removed, and the newly exposed polyethylene terephthalate surface may be bonded to glass.

In may be useful to apply a polymer film or polymer films to a glass film shortly after the solid glass film is formed from molten glass flow, because this can reduce the likelihood that the glass film will shatter as it is further cooled or further processed. In some cases it may be undesired for the final glass to include polymer films. In such cases, it may be useful to releaseably attach a polymer film or films to the glass film. This can reduce likelihood that the glass film will shatter during processing and allow the polymer film or films to be removed. In some embodiments, one or two polymer films may be releaseably attached directly to one or two major surfaces of a glass film by selecting polymeric materials that have low bond energies with the glass film. In some embodiments, the polymer materials may be selected such that a permanent bond or bonds with the glass film is obtained or such that a first polymer film is permanently bonded to a first major surface of the glass film and a second polymer film is releaseably bonded to a second major surface of the glass film. In some embodiments, a polymer film is attached to a glass film where the polymer film includes two layers, a first layer permanently bonded directly to the glass film and a second layer releaseably bonded to the first layer. The polymer film may be attached to the glass film during processing and the second layer later removed leaving the first layer permanently bonded to the glass film.

Figure 2:
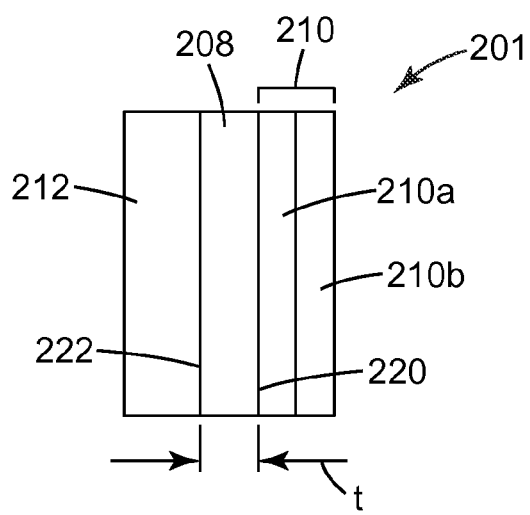
FIG. 2 is a cross-sectional view of a glass and polymer film assembly.

An exemplary glass and polymer film assembly 201 is illustrated in FIG. 2. Assembly 201 includes glass film 208 having first major surface 220 and second major surface 222 opposite first major surface 220, first polymer film 210, and optional second polymer film 212. First polymer film 210 may be a homopolymer which may be an oriented semicrystalline polymer. Alternatively, first polymer film 210 may include a plurality of layers, such as first layer 210a and second layer 210b as illustrated in FIG. 2. First layer 210a, which is immediately adjacent glass film 208, may be a homopolymer which may be an oriented semicrystalline polymer. Second layer 210b can be any additional layer, such as an additional polymer film layer or an additional glass film layer. Similarly, optional second polymer film 212, if included, may be a homopolymer, which may be an oriented semicrystalline polymer, or may include a plurality of layers and the layer immediately adjacent the glass film may be a homopolymer which may be an oriented semicrystalline polymer. Optional second polymer film 212, if included, may be permanently or releaseably bonded to glass film 208. First layer 210a may be permanently bonded to glass film 208, while second layer 210b may be permanently or releaseably bonded to first layer 210a. Glass film 208 has a thickness t, which may be in the ranges described elsewhere. For example, the thickness t may be less than about 1 mm and may be greater than about 1 micron.

EXAMPLES

Example 1

SOLIDWORKS solid modeling software (available from Dassault Systèmes SOLIDWORKS Corp., Waltham, Mass.), was used to simulate preheated polymer layers bonded to hot glass. The simulation modeled a laminate of a first polymer film, a glass film, and a second polymer film made using the system illustrated in FIG. 1. Each of the first and second polymer films were 30 μm thick PET films and the glass film was a 10 μm thick sheet of glass. The PET was at a 100° C. initial temperature, and the glass was at a 400° C. initial temperature. It was assumed that contact between the rollers and the polymer film was insulating.

Table I gives the thermal profile of the cross-section of the laminate after 0.001 seconds.

TABLE I

| Node | Approximate Position | Temperature (° C.) |
| --- | --- | --- |
| 1 | Center of glass | 178.9 |
| 2 | Interface between glass and PET | 177.8 |
| 3 | Center of PET | 156.9 |
| 4 | Near outer edge of PET | 140.8 |

Figure 3:
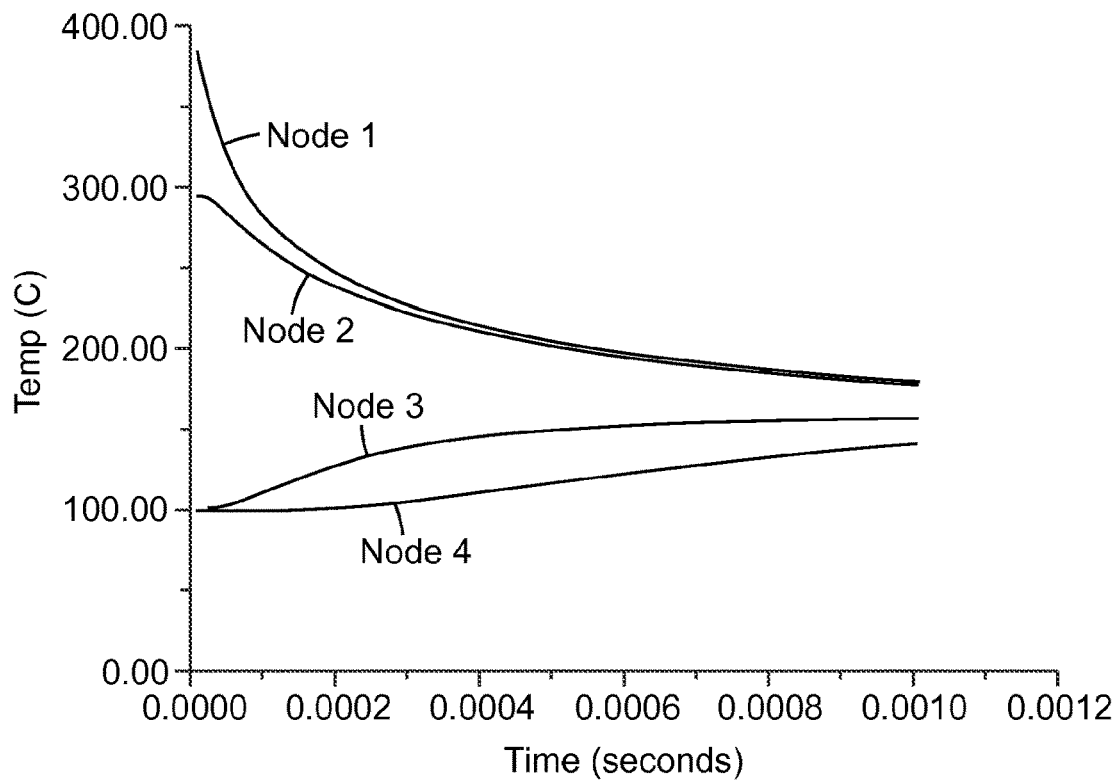
FIGS. 3-4 are graphs of the temperature history of four points in a glass and polymer film assembly.

The temperature history was taken for the 4 nodes (i.e., positions) shown in Table I, and the results are provided in FIG. 3. The melting point of PET is about 260° C. FIG. 3 shows that the surface of the PET briefly exceeded the melting point while the center of the PET remained below 200° C.

Example 2

Figure 4:
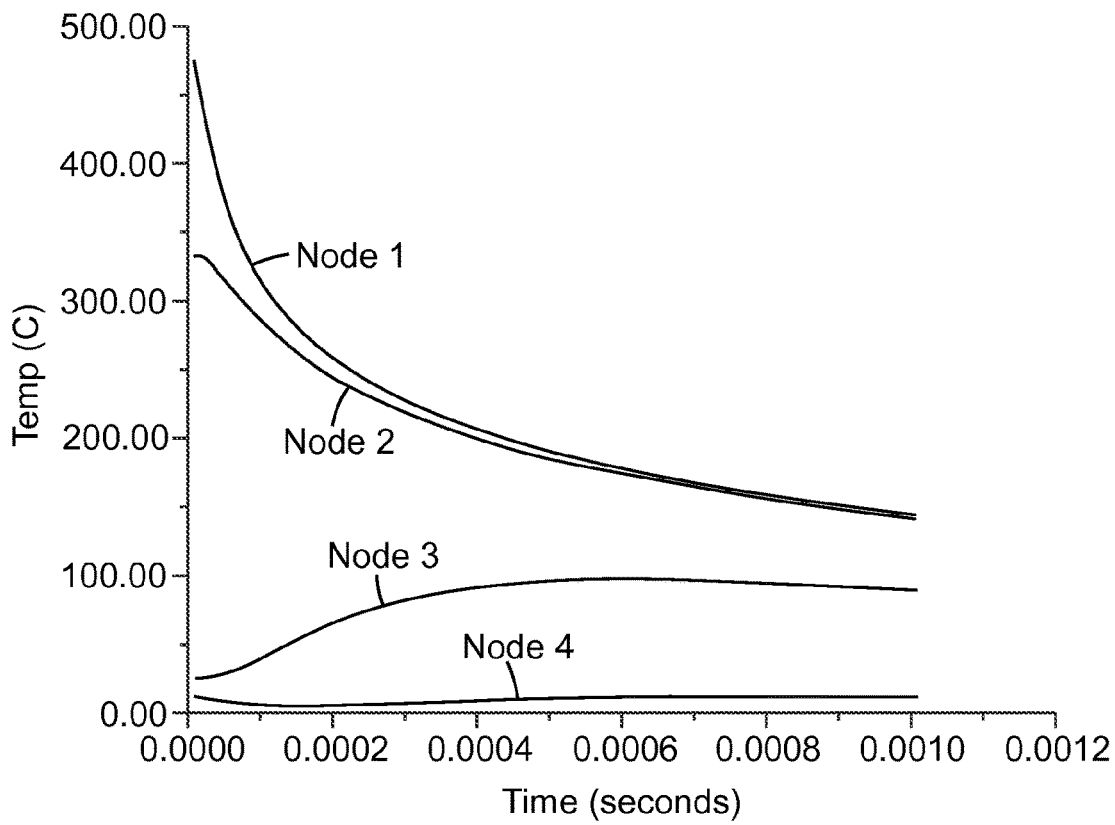

The simulation of Example 1 was repeated with thermal conditions representing cooling of the film during lamination. The initial polymer temperature was 25° C. and the roller temperature was 0° C. It was assumed that there was no thermal resistance between the roller temperature and the surface of the polymer layer in contact with the roller. The initial glass temperature was set to 500° C. The results with these thermal conditions are shown in FIG. 4.

Example 3

Figure 5:
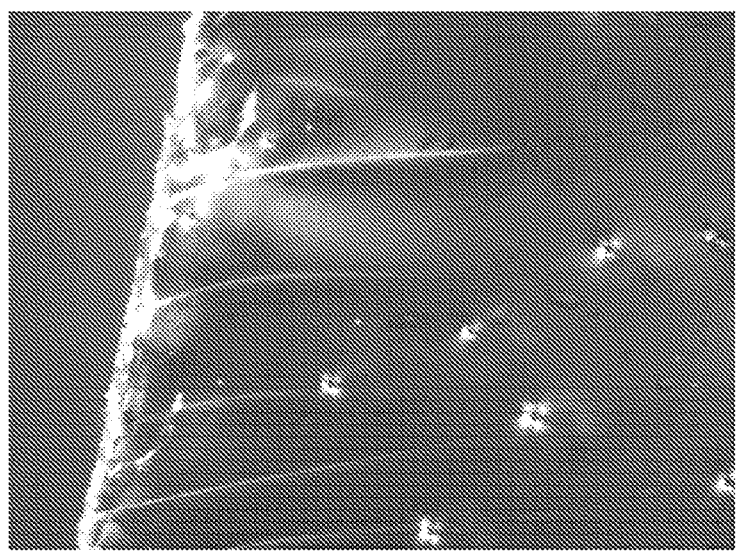
FIG. 5 is an image of a cut glass and polymer film assembly.

A 6 mm standard wall borosilicate glass tube was heated to a temperature above its softening point such it could be blown. The glass tube was then expanded into a thin-walled glass bubble. During the expansion of the bubble, the hot glass came in contact with a 25 micron thick PET film that did not include a slip agent or a primer. A composite laminate resulted with a total thickness of 80 microns. The laminate was cut with a pair of scissors, and the cut edge is shown in FIG. 5. The fractures in the glass radiating from the cut are visible in the figure. No visible delamination between the polymer film and the glass was observed indicating that the polymer film was permanently bonded to the glass.

Example 4

Example 3 was repeated, but Enhanced Specular Reflector (ESR), a reflective multilayer birefringent polymeric optical film available from 3M Company (St. Paul, Minn.), was used for the polymer film and the film was backed with a stainless steel sheet. The glass film bonded to the ESR. After bonding, the ESR was still highly reflective, showing that the hot glass only melted a fraction of the thickness of the ESR.

The Following is a List of Exemplary Embodiments of the Present Description.

Embodiment 1 is a glass and polymer film assembly, comprising:
  a glass film having a thickness less than about 1 mm and having a first major surface and a second major surface opposite the first major surface, and
  a first homopolymer permanently bonded to the first major surface of the glass film, the first homopolymer an oriented semicrystalline polymer.

Embodiment 2 is the glass and polymer film assembly of claim 1, further comprising a polymer layer attached to the second major surface of the glass film.

Embodiment 3 is the glass and polymer film assembly of claim 2, wherein the polymer layer is releaseably attached to the second major surface of the glass film.

Embodiment 4 is the glass and polymer film assembly of claim 2, wherein the polymer layer is a second homopolymer that is permanently bonded to the second major surface of the glass film, the second homopolymer an oriented semicrystalline polymer.

Embodiment 5 is the glass and polymer film assembly of claim 4, wherein the first and second homopolymers have substantially balanced degrees of orientation.

Embodiment 6 is the glass and polymer film assembly of claim 4, wherein the first and second homopolymers produce substantially balanced forces on the glass film.

Embodiment 7 is the glass and polymer film assembly of claim 1, further comprising one or more film layers adjacent the first homopolymer opposite the glass film.

Embodiment 8 is the glass and polymer film assembly of claim 1, wherein the thickness of the glass film is less than about 0.5 mm.

Embodiment 9 is a method of forming a glass and polymer film assembly, comprising the steps of:
  providing a first polymer film;
  providing a glass sheet having a first major surface and a second major surface opposite the first major surface, the glass sheet having a thickness less than about 1 mm;

applying the first polymer film to the first major surface of the glass sheet, wherein the glass sheet is at a temperature above a bonding temperature of the first polymer film during the step of applying the first polymer film; and allowing the first polymer film to bond to the first major surface of the glass sheet.

Embodiment 10 is the method of claim 9, wherein the first polymer is oriented.

Embodiment 11 is the method of claim 9, further comprising the steps of: providing a second polymer film; and applying the second polymer film to the second major surface of the glass sheet, wherein the glass sheet is at a temperature above a bonding temperature of the second polymer film during the step of applying the second polymer film; and allowing the second polymer film to bond to the second major surface of the glass sheet.

Embodiment 12 is the method of claim 11, wherein the step of applying the second polymer film occurs concurrently with the step of applying the first polymer film.

Embodiment 13 is the method of claim 11, wherein the first and second polymer films are oriented.

Embodiment 14 is the method of claim 13, wherein first and second polymer films have balanced degrees of orientation.

Embodiment 15 is the method of claim 9, wherein the bonding temperature is above room temperature.

Embodiment 16 is the method of claim 9, wherein a temperature at an interface between the first polymer film and the glass sheet is above the bonding temperature for a time in a range of about 0.01 milliseconds to about 1 milliseconds.

Embodiment 17 is a method of forming a glass and polymer film assembly, comprising the steps of:

providing a first polymer film;

providing a molten glass at a first temperature;

forming a glass sheet by cooling the molten glass to a second temperature higher than a bonding temperature of the first polymer film and higher than room temperature, the glass sheet having a first major surface and a second major surface opposite the first major surface;

applying the first polymer film to the first major surface of the glass sheet, wherein the glass sheet is at the second temperature during the step of applying the first polymer film; and allowing the first polymer film to bond to the first major surface of the glass sheet.

Embodiment 18 is the method of claim 17, wherein the first polymer is oriented.

Embodiment 19 is the method of claim 17, further comprising the steps of:

providing a second polymer film; and applying the second polymer film to the second major surface of the glass sheet, wherein the glass sheet is at a temperature above a bonding temperature of the second polymer film during the step of applying the second polymer; and allowing the second polymer film to bond to the second major surface of the glass sheet.

Embodiment 20 is the method of claim 19, wherein the step of applying the second polymer film occurs concurrently with the step of applying the first polymer film.

Embodiment 21 is the method of claim 19, wherein the first and second polymer films are oriented.

Embodiment 22 is the method of claim 17, wherein the glass sheet has a thickness less than about 1 mm.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A method of forming a glass and polymer film assembly, comprising the steps of:

providing a first film comprising an oriented first polymer layer and a glass layer releasably bonded to the first polymer layer;

providing a glass sheet having a first major surface and a second major surface opposite the first major surface, the glass sheet having a thickness less than about 1 mm;

applying the first film directly to the first major surface of the glass sheet such that the first polymer layer contacts the first major surface of the glass sheet, wherein the glass sheet is at a temperature above a bonding temperature of the first polymer layer during the step of applying the first film;

allowing the first polymer layer to permanently bond to the first major surface of the glass sheet, wherein the first polymer layer remains oriented after being bonded to the glass sheet and removing the glass layer from the first polymer layer after the first polymer layer has been permanently bonded to the first major surface of the glass sheet.

2. The method of claim 1, wherein the first polymer layer is a homopolymer layer.

3. The method of claim 1, further comprising the steps of:

providing a second film, the second film comprising an oriented second polymer layer; and applying the second film directly to the second major surface of the glass sheet such that the second polymer layer contacts the second major surface of the glass sheet, wherein the glass sheet is at a temperature above a bonding temperature of the second polymer layer during the step of applying the second film; and allowing the second polymer layer to bond to the second major surface of the glass sheet, and wherein the second polymer layer remains oriented after being bonded to the glass sheet.

4. The method of claim 3, wherein the step of applying the second film occurs concurrently with the step of applying the first film.

5. The method of claim 3, wherein the first and second polymer layers are homopolymer layers.

6. The method of claim 5, wherein the first and second polymer layers have balanced degrees of orientation.

7. The method of claim 1, wherein the bonding temperature is above room temperature.

8. The method of claim 1, wherein a temperature at an interface between the first polymer layer and the glass sheet is above the bonding temperature for a time in a range of about 0.01 milliseconds to about 1 millisecond.

9. A method of forming a glass and polymer film assembly, comprising the steps of:

providing a first film comprising an oriented first polymer layer and a glass layer releasably bonded to the first polymer layer;

providing a molten glass at a first temperature;

forming a glass sheet by cooling the molten glass to a second temperature higher than a bonding temperature of the first polymer layer and higher than room temperature, the glass sheet having a first major surface and a second major surface opposite the first major surface;

applying the first film directly to the first major surface of the glass sheet such that the first polymer layer contacts the first major surface of the glass sheet, wherein the glass sheet is at the second temperature during the step of applying the first film;

allowing the first polymer layer to permanently bond to the first major surface of the glass sheet, wherein the first polymer layer remains oriented after being bonded to the glass sheet; and removing the glass layer from the first polymer later after the first polymer layer has been permanently bonded to the first major surface of the glass sheet.

10. The method of claim 9, wherein the first polymer layer is a homopolymer layer.

11. The method of claim 9, further comprising the steps of:
providing a second film, the second film comprising an oriented second polymer layer; and applying the second film directly to the second major surface of the glass sheet such that the second polymer layer contacts the second major surface of the glass sheet, wherein the glass sheet is at a temperature above a bonding temperature of the second polymer layer during the step of applying the second film; and allowing the second polymer layer to bond to the second major surface of the glass sheet, wherein the second polymer layer remains oriented after being bonded to the glass sheet.

12. The method of claim 11, wherein the step of applying the second film occurs concurrently with the step of applying the first film.

13. The method of claim 11, wherein the first and second polymer layers are homopolymer layers.

14. The method of claim 9, wherein the glass sheet has a thickness less than about 1 mm.

15. The method of claim 9, wherein a temperature at an interface between the first polymer layer and the glass sheet is above the bonding temperature of the first polymer layer for a time in a range of about 0.01 milliseconds to about 1 millisecond.

* * * * *

UNITED STATES PATENT AND TRADEMARK OFFICE
CERTIFICATE OF CORRECTION

PATENT NO. : 10,688,768 B2
APPLICATION NO. : 15/326215
DATED : June 23, 2020
INVENTOR(S) : Andrew Ouderkirk It is certified that error appears in the above-identified patent and that said Letters Patent is hereby corrected as shown below:

In the Claims

<u>Column 10</u>
Line 30, in Claim 1, delete "sheet" and insert -- sheet; --, therefor.

<u>Column 11</u>
Line 15, in Claim 9, delete "later" and insert -- layer --, therefor.

Signed and Sealed this
Eighteenth Day of August, 2020

Andrei Iancu
*Director of the United States Patent and Trademark Office*